US011797918B2

(12) United States Patent
Azad

(10) Patent No.: US 11,797,918 B2
(45) Date of Patent: Oct. 24, 2023

(54) METHOD AND SYSTEM FOR RESOLVING SERVICE REQUESTS

(71) Applicant: Paul Azad, Richmond (AU)

(72) Inventor: Paul Azad, Richmond (AU)

( * ) Notice: Subject to any disclaimer, the term of this patent is extended or adjusted under 35 U.S.C. 154(b) by 146 days.

(21) Appl. No.: 16/324,877

(22) PCT Filed: Aug. 14, 2017

(86) PCT No.: PCT/AU2017/000168
§ 371 (c)(1),
(2) Date: Feb. 11, 2019

(87) PCT Pub. No.: WO2018/027257
PCT Pub. Date: Feb. 15, 2018

(65) Prior Publication Data
US 2020/0265375 A1  Aug. 20, 2020

(30) Foreign Application Priority Data

Aug. 12, 2016 (AU) ................................ 2016903186

(51) Int. Cl.
| G06Q 10/00 | (2023.01) |
| G06Q 10/087 | (2023.01) |
| G06Q 10/0631 | (2023.01) |
| G06Q 10/0639 | (2023.01) |
| G06Q 30/016 | (2023.01) |

(52) U.S. Cl.
CPC ....... *G06Q 10/087* (2013.01); *G06Q 10/0631* (2013.01); *G06Q 10/0639* (2013.01); *G06Q 30/016* (2013.01)

(58) Field of Classification Search
CPC ............. G06Q 10/087; G06Q 10/0631; G06Q 10/0639

USPC ...................................................... 705/16, 28
See application file for complete search history.

(56) References Cited

U.S. PATENT DOCUMENTS

| 5,953,389 A * | 9/1999 | Pruett ................. H04L 12/2856 379/9.02 |
| 2012/0042318 A1* | 2/2012 | Doan ............... G06Q 10/06315 718/103 |
| 2012/0321071 A1* | 12/2012 | Fisher, Jr. .............. G06Q 10/06 379/265.09 |
| 2013/0054291 A1* | 2/2013 | Gupta .................... G06Q 10/06 705/7.13 |

OTHER PUBLICATIONS

International Search Report and Written Opinion of the International Searching Authority, dated Oct. 4, 2017, PCT.

* cited by examiner

*Primary Examiner* — Rokib Masud
(74) *Attorney, Agent, or Firm* — Dinsmore & Shohl LLP

(57) ABSTRACT

A service request resolution system for resolving requests from customers, the system including a plan maintenance component, including one or more processors, to maintain plans that include an inventory data structure detailing inventory of a plurality of customers, an expert guidance maintenance component including a request resolution data structure including possible actions to resolve requests in respect of items of inventory detailed in the inventory data structure, and an expert guidance system, including one or more processors, operable to dynamically activate and/or deactivate components of the request resolution data structure, the activation or deactivation of components effected according to the plan of a specific customer.

12 Claims, 18 Drawing Sheets

Figure 5

Location Contact

Contact

| First Name * | Last Name * | User Name * | Password * |
|---|---|---|---|
| P | Brown | ****** | oooooo |

Other Information

| Land line | 03 9555 5555 | Mobile | 0544 444 444 |
| Notes | Has authority to approve requests up to AU $10,000 | Email | brown@company123.com |
| Position * | Systems Manager | Role * | Service support contact |
| | | Move to | Service Provider |
| | | ☑ | Propagate details to child locations? |
| Tags | Search for tag(s) | | |

Admin Information

| Priority | 100 |

[Save] [Close]

Figure 6

← Position | | | | | | | | | | + Add

| Name | Onsite | | | Offsite | | | Product Purchase | Or | Ticket Total | CAPEX Approver | |
|------|--------|---|---|---------|---|---|------------------|----|--------------|----------------|--|
|      | Hours | $ | After Hours | Hours | $ | After Hours | $ | | $ | | |
| Default | 0 | 0.00 | ☑ | 0 | 0.00 | ☑ | 0.00 | | 300.00 | ☐ | |
| SDM | | | ☑ | | | ☑ | 0.00 | | 100000.00 | ☐ | Delete |
| MD | 20 | | ☑ | 20 | | ☑ | 0.00 | | 999999.00 | ☑ | Delete |
| OM | | | ☑ | | | ☑ | 0.00 | | 100000.00 | ☐ | Delete |

Figure 7

Manage Transaction type

Transaction Type List

| Search | Search By Transaction Type | 🔍 Go | | Channel | G2 | ▼ | Plan | Pro |

| Transaction type ◆ | Description Template ◆ | GL Code | ◆ Creditor | Debtor | Free Min | ◆ Minimum Min | ◆ Increments (Min) | ◆ Unit Price (USD) ◆ | |
|---|---|---|---|---|---|---|---|---|---|
| Off site labour | | 41100 – Remote | * | | 0 | 30 | 15 | 1.66 | Edit |
| On site labour | | 41100 – Remote | * | | 0 | 30 | 30 | 2.33 | Edit |

Figure 8

| Windows 2012 R2 | ☐ Support Maintenance | 0.00 | Monthly ▶ | 1 ▶ | Edit | Deactivate |

Add item

| [Category] Question | ▶ | [Users] Users can not log on to a computer | Edit | Deactivate |
| [Category] Question | ▶ | [Applications] Patch Management is not working | Edit | Deactivate |
| [Category] Question | ▶ | [Operating System] RDP into RCA device? | Edit | Deactivate |
| [Category] Question | ▶ | [Server] Do you need RDP into this server? | Edit | Deactivate |
| [Category] Question | ▶ | [Operating System] VNC into a RCA Device? | Edit | Deactivate |

Figure 9

| Pro | ☑ Support Maintenance | 45.00 | Monthly ▶ | 1 ▶ | Edit | Deactivate |
|---|---|---|---|---|---|---|

Add item

| [Category] Question | ▶ | [Users] Does a user need to have their password reset? | Edit | Deactivate |
|---|---|---|---|---|
| [Category] Question | ▶ | [Users] Is the AD user account disabled? | Edit | Deactivate |
| [Category] Question | ▶ | [Users] Is the AD user account locked out? | Edit | Deactivate |

Figure 11

Add/Edit question

Question

Header

Does the display show "Press Ctrl.-Alt.Del.?"    Code # | Q_000000970

Description    Tags * | Select tags

Activity type * | Off Site

Boolean ▶   Options    Category * | Users

Specify Options here...    Proficiency | 2

Compliences * | *{business equipment award} Level 1 Technician

Hours | 0

Minutes | 0

Sec | 5

Priority | 50

NEXT STEP CONDITION

Option value is | Equal to ▶ | No

NEXT ACTION

Next step condition true action | Move to question ▶ | {Users} Press Ctl.-Alt.Del – Does the log in screen show?

Next step action false action | Move to question ▶ | {Users} Does the keyboard have a light on?

▶ | + Add condition

Save    Close

Figure 12

Service Resource Details

| Contact | Action Proficiency | Compliance | Proficiency Matrix |

First Name *: P
Last Name *: Smith
User Name *: ******
Password *: ooooo

Other Information

Land line: 03 9444 4444
Notes: Available to conduct onsite visits in Melbourne Metro
Mobile: 043333333
Email: smithp@serviceprovider.com
Position *: Service technician
Role *: Service support
Move to: ☑ Service Provider
☐ Propagate details to child locations?
Tags: Search for tag(s)

Admin Information

Priority: 50

Close
Save

Figure 13

| Location Contact | | | |
|---|---|---|---|
| Contact | Action Proficiency | Compliance | Proficiency Matrix |

Compliance: Business Equipment Award ▶

Clasification: Level 2 Technician ▶

Save    Close

Figure 14

| Contact | Action Proficiency | Compliance | Proficiency Matrix |
|---|---|---|---|

| Question | | Category | Users | 🔍 Go |
|---|---|---|---|---|

Showing 1 - 50 of 56 Records

| | Proficiency |
|---|---|
| Can they see their desktop icons? | |
| Are they entering the correct password? | 5 |
| User cannot login to Windows? | 5 |
| Check which account haven't login in for 90 days? | 5 |
| Is the keyboard connected to the PC with wire? | 5 |
| Ensure CAPS LOCK is off and NUM LOCK is on and enter your user name and | 5 |
| Does a user need to have their password reset? | 5 |
| Was the user able to login now that the account has been unlocked? | 5 |
| Check Exchange user details, enter the user name in the pop up notes field. | 5 |
| Retry username and password ensuring using correct case (NUM LOCK/CAPS | 5 |
| Do you need to unlock the account? | 5 |
| USERS Level 4 On site to resolved? | 5 |
| Issue Resolved. show the user how to login correctly. | 5 |
| Does another message display on the screen? | 5 |

Figure 15

| Location Contact | | | | |
|---|---|---|---|---|
| Contact | Action Proficiency | Compliance | Proficiency Matrix | |

Search: ____

| Category | 3rd Party Liaising | Labour 3rd Party AV | Labour 3rd Party CCTV | Labour 3rd Party L |
|---|---|---|---|---|
| Active Directory | 6 | 6 | 6 | |
| Applications | 6 | 6 | 6 | |
| Audio & Visual | 6 | 6 | 6 | |
| Backup | 6 | 6 | 6 | |
| Cabling | 6 | 6 | 6 | |
| CCTV | 6 | 6 | 6 | |

☐ Save Proficiency

[Close]   [Save]

Figure 16

New Incident Entry

| Filter | Show |

Customer:[{Code:Card} Code:Location] (?)
[Customer X] Sales Office

Reported By Contact *
John Brown

Contact Email
john@company123.com

Contact Phone
03 9555 5555

Priority    Source
60          Phone
Due Date    Due Time

SLA Time min (Debug)
0

Queue *
Support

Created By *
Smith

---

1007886                    Title: User cannot login to windows

Start new incident

Sub Location: Workstation 1          Category: Users

Hold Incident:
| Customer not ready/busy | Technical Operator Requested | Freight | Third party | Close |

Question History:
Question: User cannot login to windows?        Answer: Yes
Question: Is the PC connected to a domain environment?    Answer: Yes Next Question:
Dot hey have the correct username?:

| Yes | No |

Notes....

Figure 17

Incident Entry

| # | 1002681 | Customer | Henry James & Associates | Location | Hj Hoddle St |
|---|---|---|---|---|---|
| Status | Invoiced | Category | Applications | Sub | Office |
| | | Title | Email is stuck in outbox | Location | |

Site Inventory | History | Attachments | Site Notes

Filter [ ] Hide [ ] History [ ] Hide

| Date | Created By | Reported By | Description | Inventory | SLA Time | Real Time | Notes | Actions |
|---|---|---|---|---|---|---|---|---|
| 15/02/2016 | John Jones | Bob White | Q: Email is stuck in outbox. A: Yes | | 00:00 | 00:00:03 | | Check Notes |
| 15/02/2016 | John Jones | Bob White | Q: Ask user to go to a website they normal go to to check if the Internet is working for them. Is it working? A: Yes | | 00:00 | 00:00:10 | | Check Notes |
| 15/02/2016 | John Jones | Bob White | Q: Ask user to look in the outbox folder, is there more than 1 email? A: Yes | | 00:00 | 00:01:38 | | Check Notes |
| 15/02/2016 | John Jones | Bob White | Q: Move the oldest email out from the outbox into the drafts folder and perform a send & receive. Does the other emails now go? A: No | | 00:01 | 00:03:53 | | Check Notes |
| 15/02/2016 | John Jones | Bob White | Q: Move all the emails from the outbox to the drafts folder, create a new email and send it back to the user. Does the email send OK? A: No | | 00:02 | 00:04:18 | | Check Notes |
| 15/02/2016 | John Jones | Bob White | Q: APPLICATION Level 3 Off site to resolved? A: No | | 00:03 | 00:06:32 | | Check Notes |
| 15/02/2016 | John Jones | Bob White | Q: APPLICATION Level 4 Off site. A: Yes | | 01:00 | 00:06:32 | | Check Notes |

METHOD AND SYSTEM FOR RESOLVING SERVICE REQUESTS

FIELD OF THE INVENTION

The present invention relates to a method and system to receive and resolve service requests. The present invention finds particular use in industries such as information technology software and hardware support and, in particular, in the deployment of service resources such as service technicians and the allocation of service requests to service technicians. The present invention may also find use in other industries, such as in accounting, legal or any other service industry where services are requested by consumers, and resolution of those requests is required.

BACKGROUND OF THE INVENTION

Service industries, such as information technology service industries, have employees and/or contractors that are dedicated to providing technical support in response to service requests from consumers. Once an organisation, such as an information technology services organisation, receives a service request associated with an incident (for example, a user unable to send and/or receive electronic mail), a pending task (or "support ticket" as is known in information technology service industries) is generated which remains outstanding until the incident is resolved, usually by the attendance and action of technical support personnel.

Service requests submitted by consumers to service industry organisations are typically managed by the generation of a list of outstanding, or "open", support tickets that are made available to technical support personnel, for example, service technicians or any employee/person associated with the organisation that is able to provide technical support. Typically, a description of the incident associated with a particular service request is also recorded and made available to technical support personnel who are able to view the description associated with any support ticket within the list of open support tickets and choose a support ticket on which to commence work.

Incoming service requests are typically managed manually by an operator associated with a service provider who, upon receiving a service request, generates a support ticket and assigns the task of resolving the service request to a service technician that is available to attend to the request. The service request is then added to a list of open support tickets that have been allocated to that particular service technician and remain pending until selected by the service technician. Whilst the manual management and allocation of service requests remains manageable and feasible when there are a relatively small number of incoming service requests, the process becomes increasingly difficult and infeasible to manage in situations where there are a large number of simultaneous incoming service requests.

In addition, as part of the current process of managing service requests, accurate consideration is typically not given to the skill, experience, qualifications or availability of the service technician which can often result in incidents associated with one or more support tickets remaining unresolved due to the lack of a necessary attribute of the support person to whom the support ticket has been assigned. Similarly, support tickets in relation to simple tasks are often assigned to highly skilled service technicians having high hourly charge rates which not only results in unnecessary expenditure for the customer, but is also a waste of a valuable service resources' skill and time.

The current approach of allowing a technical support person to review the entire list of open support tickets and any associated description of the respective incidents effectively means that a service technician is able to "pick and choose" any open support ticket from the list of available open support tickets on the basis of the service technician's preference. In this regard, support tickets with associated incidents that are difficult or time consuming to solve tend to remain unselected by service technicians and are therefore left outstanding and stagnate within the list of open support tickets. This is problematic from a consumer perspective since customers that have submitted details of difficult incidents to resolve are sometimes required to wait days, if not weeks, for a particular service request to receive attention and have the incident resolved. This is also problematic from the perspective of the service organisation since the lack of service efficiency tends to result in customer dissatisfaction and potential damage to the organisation's reputation thereby leading to lower customer engagement and ultimately loss of revenue.

The ability for technical support personnel to "pick and choose" support tickets on the basis of preference is also problematic in instances where a support ticket requires attention by a technician having specific skills, qualifications and/or experience in order to efficiently complete the task and resolve the incident. In such situations, if a technician selects a support ticket that requires an attribute beyond the skill set or required availability of that particular service technician, it is likely that the incident will either remain unresolved, will take longer to complete than would otherwise be required, will re-occur or will require the attention of an alternative technician having the requisite skills, experience and qualifications. It will be appreciated that each of these outcomes is time-consuming and therefore frustrating and undesirable from the customer's perspective who submitted the service request. Such outcomes are also undesirable from the service organisation's perspective since they substantially hinder the efficient provision of services.

Present arrangements in which a service technician initially addresses a customer service request often results in questions being asked of the customer that are irrelevant. This particular aspect of existing systems is frustrating and undesirable from a customer's perspective and can result in loss of clientele by the service organisation or at the very least, the provision of a service delivery that is inefficient, time-consuming and more costly as compared with service deliveries that are effectively delivered.

The problems associated with an initial service technician receiving contact from a customer and asking questions that are irrelevant to the customer is increasingly causing customers to become frustrated and seek alternative suppliers of the services they require. This is particularly the case where a call-centre is located offshore or remotely from the customer's location but in any event, where the service technician who receives an initial call is unaware of the customer's installed inventory, they will generally ask questions that are irrelevant to the customer. It is the initial service technician who is usually a relatively low skilled operator who creates the open ticket for a customer request before passing the open ticket to an appropriately skilled technician to resolve the customer's request.

Current methods of diagnosing and managing service requests usually require service technicians to troubleshoot a problem using memory, online forums or manuals. The use of memory requires each technician to rely upon their own knowledge, skills and experience acquired over a period of time and therefore requires a service technician to accurately retain and recollect information. In addition, online forums are often inaccurate or out of date and manuals are also often out of date or not available. Accordingly, the use of memory, online forums and/or manuals when attempting to resolve a customer's service request results in an inconsistent quality of service in which different technicians often approach the same task using different resolution steps.

Yet another problem associated with current systems and methods of diagnosing and managing service requests is inconsistency in the outcome of the service request. For example, the same service request could be resolved by one particular service technician, yet remain unresolved when directed to another service technician.

Further problems associated with current systems for managing service requests include the failure of service technicians, on occasion, to respond to service requests in a timely manner and also failing to prioritise tasks according to the urgency established in a customer's service agreement between the service provider and the customer.

Accordingly, a need exists for a system and method to receive and efficiently accommodate service requests within service industries. The system and method of the present invention seeks to address at least some of the above mentioned problems associated with current systems and methods of accommodating service requests and/or provide an alternative. It will be appreciated that whilst the present invention is described with reference to the information technology industry, the system and method of the invention may be suitable for any industry for which one or more services are provided.

SUMMARY OF THE INVENTION

Diagnosis and Initial Attempt to Resolve a Service Request

In one aspect, the present invention provides a service request resolution system for resolving one or more requests from customers, the system including a plan maintenance component, including one or more processors, to maintain plans that include an inventory data structure detailing inventory of a plurality of customers, an expert guidance maintenance component including a request resolution data structure including possible actions to resolve one or more requests in respect of items of inventory detailed in the inventory data structure, and an expert guidance system, including one or more processors, operable to dynamically activate and/or deactivate components of the request resolution data structure, the activation or deactivation of components effected according to the plan of a specific customer, wherein each action within the request resolution data structure is assigned a priority, each source of the request is assigned a priority, and each location associated with each source of the request is assigned a priority; and one or more processors calculate a total priority of the customer request, with the total priority based upon one or more of the priorities assigned to each action, source of the request, or location.

A request resolution data structure preferably defines possible actions in response to any service request according to the collective knowledge of subject matter experts and any procedural preferences and/or requirements for resolving customer requests. A "procedural preference" could include an action to replace a device, instead of attempting to repair the device, if the cost of replacing the device is less expensive compared with repairing the device. A "requirement" could include an action that is required to be performed according to a regulatory requirement, for example, any worn or damaged wiring need to be replaced.

It will be appreciated that since the expert guidance system is operable to dynamically activate or deactivate components of the request resolution data structure according to the plan of a specific customer, the request resolution data structure is able to be updated/amended (as required) with respect to all inventory items that are used by customers but is specifically tailored and/or configured by activating and/or deactivating components when required for a particular customer.

For example, in accordance with an embodiment of the invention, if a customer has a plurality of computers operating with the Windows 10 operating system, the inventory data structure maintained within the plan associated with the customer's location will detail all computers using the Windows 10 operating system. In the event the customer updates their IT system and introduces one or more computers operating with the Mac OS, the plan associated with the customer's location would be updated so that this additional inventory is detailed in the inventory data structure. Once computers using a Mac OS (that represent additional inventory) are included within the inventory data structure maintained within a customer's plan, the expert guidance system will activate components of the request resolution data structure pertaining to Mac OS, so that actions to resolve requests in respect of computers operating Mac OS are presented to an initial service technician who receives the request and conducts the initial conversation with the customer.

In an embodiment, each action defined within a request resolution data structure is assigned a proficiency. The assigned proficiency is the minimum proficiency that an individual (for example, a service technician) must have in order to attend to the action.

An action, within the context of the invention, can be a question pertaining to a service request or can be a task that requires execution as part of the resolution process.

It will be appreciated that the request resolution data structure may be expanded over time to include actions associated with previously unforeseen incidents, or may be expanded to cover additional inventory, for example, new operating systems issued by software developers or new devices available in the marketplace.

In view of the ability to expand the request resolution data structure over time, the system and method of the invention is able to be promptly configured to accommodate new items of inventory installed by a customer. The dynamic activation and/or deactivation of components reduces the amount of irrelevant questions that would otherwise be asked of a customer, and also accommodates new items of customer inventory which results in a more efficient and cost effective resolution process thereby assisting a service provider to meet their Service Level Agreement (SLA) with a customer.

In an embodiment, one or more plans can be associated with a customer at a location level, a sub-location level, or alternatively can be associated with a customer device or system level. In an alternative embodiment, a plan can be associated with a customer at the highest level and encompass all locations, sub-locations and devices.

A plan may be specific to a customer or location, or may be applicable to a plurality of different customers or locations.

A plan, within the context of the invention, could define inventory at a high level within an organisation such as a computer operating system implemented on all computers within the organisation. For example, all computers within an organisation operate a Microsoft Windows 2008 operating system.

Alternatively, a plan could define inventory at a lower level including individual devices at specific locations within an organisation and may include details of the device together with the essential requirements to operate the device. For example, all computers within an organisation are connected to Epson Workforce WF-3640 printers that require power, paper and ink cartridges (all detailed with specifications and/or part numbers) to operate. Details of periodic maintenance requirements could also be included.

The term "inventory" within the context of the invention includes devices and/or systems (and any associated operating requirements with such devices and/or systems), a customer (or group of customers), a person or a group of people having some association. Inventory also includes a location, sub-location and even a virtual location such as a section or department within an organisation.

For example a medical facility (hospital) could have various sections or departments such as Cardiac, Paediatric etc. departments which causes the expert guidance system to activate and/or deactivate components of the request resolution data system in accordance with one or more plans.

The term "inventory" within the context of the invention could also refer to intangible inventory and includes services provided and/or offered by an individual, a group of people or a Company. For example, with respect to an accountancy firm, intangible inventory of the firm can include the one or more services that the firm offers, for example, completion of annual personal tax returns.

Accordingly, the term "inventory" effectively includes, with respect to a plan, what is relevant to particular customer in order to cause the expert guidance system to activate and/or deactivate components of the request resolution data structure.

For example, inventory may include, but is not limited to, operating systems (software), hardware, utilities (power, gas, water), stationery, Point of Sale (POS) machines, lighting, alarms, cooking apparatus, refrigerators, heating/cooling systems.

In an embodiment, the system further includes a customer service requirement maintenance component in which a service requirement data structure is maintained, the service requirement data structure defining one or more service requirements with respect to each customer.

A "customer service requirement" could include the specification, by a customer, that all service requests are to be completed within a specified period and within a pre-defined budget.

In an embodiment, each action within the request resolution data structure is assigned a priority.

In an embodiment, a priority, is assigned to a location or sub-location associated with each of the plurality of customers. In an embodiment, the priority may be associated with a source of the request, for example, an individual who submitted the request at a particular customer location or sub-location. Alternatively, a request may be automatically generated through system monitoring at a particular location or sub-location. In an embodiment, the assigned priority will be subject to the terms of any service level agreement existing between the customer and a service provider.

A "location" within the context of the invention may be a physical location such as a site, a premises, a person, or group of persons, or may be a sub-location such as a room (for example an office or boardroom) within the site or premises. Alternatively, a "location" may be a device (for example, a personal computer) located within a location or sub-location, and may include a hierarchy of elements.

In an embodiment, the system includes one or more processors that calculate a total priority for each service ticket generated by a service officer who receives the service request from a customer. In an embodiment, the total priority is based upon one or more of the priorities assigned to each action, source of the request or location.

It will be appreciated that the use of a plan in combination with a request resolution data structure including possible actions to resolve requests, enables actions that specifically relate to a device that is the subject of the service request to be provided to a service resource (e.g., a service officer) which avoids the need to have a skilled resource attend to the service request in the first instance. This enables a service provider to allocate resources much more efficiently and also avoids over-charging the customer as a result of allocating a highly skilled resource with a high hourly charge rate to create a service ticket in relation to a service request that could otherwise have been resolved by a resource of lower skill and lower hourly charge rate.

In an embodiment, the system includes an inventory mapping tool, enabling the inventory of a customer to be identified and maintained within the inventory data structure.

It will be appreciated that the ability to identify, from the outset, the inventory of a customer, in combination with the ability to activate or deactivate components of a request resolution data structure according to a customer plan, eliminates, or at least substantially reduces, subjecting a customer to irrelevant questions and tasks during the service request resolution process.

If, for example, all of the computers in an organisation operate using a Windows OS, the plan associated with a customer will reflect this as part of the inventory data structure such that any components of the request resolution data structure associated with resolving Mac OS incidents will be deactivated. Accordingly, the initial service technician that attends to the initial service request and who creates a service ticket will not be prompted by the expert guidance system to present any queries to the customer associated with resolving incidents relating to a computer operating a Mac OS.

It will be appreciated that by the use of a plan in combination with a request resolution data structure and an expert guidance system, the list of possible problem/resolution paths that would otherwise be presented to a service technician in a typical resolution process will be substantially reduced such that irrelevant queries and actions when attempting to resolve a service ticket are avoided or at least reduced.

In an embodiment, the inventory data structure is able to be updated to include additional inventory, for example, in the event a customer purchases one or more new devices. Alternatively, the inventory data structure is able to be updated to delete existing inventory, for example, in the event a customer removes one or more devices from their premises.

In another aspect, the present invention provides a computer-implemented method of resolving service requests from customers, the method including maintaining, in a plan maintenance system component, one or more plans that include an inventory data structure detailing inventory of a plurality of customers, maintaining, in an expert guidance maintenance component, a request resolution data structure including possible actions to resolve requests in respect of items of inventory detailed in the inventory data structure, and activating and/or deactivating components of the request resolution data structure by the use of an expert guidance system, wherein the activation or deactivation of components is effected according to the plan of a specific customer.

In another aspect, the present invention provides a computer-implemented method of resolving service requests from customers by a service officer, the method including the service officer accessing a service request resolution system for resolving requests from customers, the system including a plan maintenance component, including one or more processors, to maintain plans that include an inventory data structure detailing inventory of a plurality of customers, an expert guidance maintenance component including a request resolution data structure including possible actions to resolve requests in respect of items of inventory detailed in the inventory data structure, and an expert guidance system, including one or more processors, operable to activate or deactivate components of the request resolution data structure, the activation or deactivation of components effected according to the plan of a specific customer, wherein each action within the request resolution data structure is assigned a priority, each source of the request is assigned a priority, and each location associated with each source of the request is assigned a priority; one or more processors calculate a total priority of the customer request, with the total priority based upon one or more of the priorities assigned to each action, source of the request, or location, the service officer completing a series of actions as guided by the expert guidance system, wherein the service request is either resolved or a service ticket associated with the service request is allocated to a service resource in the event the service officer is unable to resolve the service request.

It will be appreciated that a "service officer" can be, in an embodiment, the initial service technician who receives a customer communication regarding an incident and initiates a service request and/or generates a service ticket. Accordingly, a "service officer", within the context of the present invention, is any individual associated with a service provider that is able to accept a customer inquiry and initiate a service request. The service officer will typically be of lower skill as compared with service resources and therefore, will have a lower proficiency as compared with service resources. Due to their lower skill and proficiency, a service officer will typically not charge their time according to an hourly charge rate. Alternatively, if a service officer has an hourly charge rate, this will typically be lower as compared with the hourly charge rate of a service resource.

In an embodiment, an incident associated with a service request may be reported by a customer by a telephone call, an electronic mail or by the use of an application interface associated with the system of the present invention. Alternatively, one or more items of inventory of an organisation may be continuously or periodically monitored and a service request, in the form of a service ticket for example, may be automatically initiated by the system upon detection of an incident such as a fault or maintenance requirement.

In another aspect, the present invention provides a computer readable medium storing one or more instructions that, when executed by one or more processors associated with an expert guidance system, cause the one or more processors to activate or deactivate components of a request resolution data structure, wherein the activation or deactivation of components is effected according to a customer plan that includes an inventory data structure detailing inventory of a plurality of customers, wherein the customer plans are maintained in a plan maintenance system component, and wherein the request resolution data structure is maintained in an expert guidance maintenance component and includes possible actions to resolve requests in respect of items of inventory detailed in the inventory data structure.

In an embodiment, the system also includes a tracking system, including one or more processors, operable to maintain a service history in a service history data structure.

Since the system according to one embodiment of the invention is able to maintain a history of the initial resolution process, in the event a service request is unable to be resolved and a service ticket associated with the service request is allocated to a service resource, the service resource is able to consult the service history captured within the service history data structure thereby eliminating the resource repeating any actions already attended to during the initial resolution process.

Allocation of Service Ticket Associated with a Service Request to a Service Resource In an embodiment, the system further includes a resource information maintenance component, including one or more processors, to maintain a resource data structure including a plurality resources available to resolve requests in respect of items of inventory.

In an embodiment, the expert guidance system, including one or more processors, is operable to dynamically activate or deactivate one or more of the plurality of resources within the resource data structure according to one or more minimum criteria associated with each resource.

In an embodiment, the one or more minimum criteria include any one or more of skill, proficiency, compliance, experience and availability of the resource.

The term "compliance" within the context of the present invention includes, but is not limited to, any one or more of academic, technical or regulatory qualifications obtained by the resource.

In an embodiment, the system further includes one or more processors that determine the resource to which a service ticket, associated with the service request is to be allocated, wherein the allocation is based upon the service request in combination with any one or more of the following the request resolution data structure in which one or more components are activated and/or deactivated according to a customer plan, the resource data structure in which one or more resources are activated and/or deactivated according to one or more minimum criteria associated with each resource, the calculated total priority of the customer request, and the one or more service requirements maintained within the service requirement data structure pertaining to the customer associated with the service request.

In an embodiment, the resource is allocated a service ticket in the absence of having any knowledge regarding the details of the service request. Accordingly, the resource will see only minimal details associated with the service ticket at the time of allocation, wherein such minimal details may include the time the pending request was generated and the details regarding the origin of the service request, (i.e., the details of the person(s) or company that submitted the service request) or, in the case where the system automatically receives and records an incident (in the absence of a service request submitted by a person either by telephone or online), the source details of the received and automatically logged service ticket. In this embodiment, all details associated with the service (in addition to the minimal details already provided) will be provided to the service resource only once the service resource accepts the service ticket.

It will be appreciated that in this embodiment, once a service ticket is accepted by a service resource, the system only allows a service resource to accept the next pending service ticket once the service request associated with the previous ticket has been resolved and/or the service ticked has been marked as "completed". Accordingly, withholding at least some of the details associated with service tickets from the service resource assists in avoiding the situation where the service resource declines a service ticket associated with a service request on the basis of preference.

In another aspect, the present invention provides a computer-implemented method enabling the resolution of a service request from a customer by a resource, the method including the resource accessing a service request resolution system for resolving requests from customers, the system including a plan maintenance component, including one or more processors, to maintain plans that include an inventory data structure detailing inventory of a plurality of customers, an expert guidance maintenance component including a request resolution data structure including possible actions to resolve requests in respect of items of inventory detailed in the inventory data structure, and an expert guidance system, including one or more processors, operable to activate and/or deactivate components of the request resolution data structure, the activation and/or deactivation of components effected according to a customer plan, the resource indicating that they are ready to access a service ticket associated with the service request, the resource being allocated the next service ticket, wherein the allocation is based upon a combination of any two or more of the following, a plan associated with the customer, a calculated total priority of the service request, wherein the calculated total priority is based upon any one or more of priorities assigned to each action, source of the request, or location associated with each source of the request, one or more minimum criteria associated with the resource, and one or more service requirements associated with the customer.

In an embodiment, a service requirement includes, but is not limited to agreed and acceptable service periods within which a service request is to be resolved, budget/cost for resolving incidents, specification of service resources able to attend to the request (for example, only service resources having a certain qualification and experience rating may attend to service requests relating to a particular customer), and agreed times within which a service request may receive attention).

In an embodiment, the one or more minimum criteria of the resource include any one or more of skill, proficiency, compliance, experience and availability of the resource.

The term "incident" within the context of the present invention encompasses any fault or issue that requires the provision of a service or some action and is typically, but not necessarily, technical in nature. An example of an incident is a person's computer unable to send and/or receive email. In another example, an incident may be a request to add a staff member to the Company system database. Incidents may include a Café business being depleted in their supply of coffee beans or a Customer requiring a gardener to tend to the mowing of their lawn. Accordingly, it will be appreciated that the term "incident" has a broad meaning within the context of the invention.

Examples of possible incidents that may arise within the information technology area include, but are not limited to, unexpected system shutdown, a computer not starting, inability to print a document, inability to connect to the internet, inability to send/receive electronic mail, loss of data, inability to print and compromise of system security through one or more viruses or unauthorised access to the system. It will be appreciated that these are examples of incidents that are encompassed by the method and system of the invention and are not intended to provide an exhaustive list.

It will also be appreciated that the system and method of the invention also encompasses managing service requests associated with incidents that may arise in other service industries. Such service industries may include, but are not limited to, those that provide servicing of various appliances including television and other forms of home entertainment, electrical appliances including, coffee machines, washing machines, dishwashers, refrigerators, heating and air-conditioning services and gardening services. Once again, it will be appreciated that these are merely examples of various service industries in which the method and system of the present invention may find use and are not intended to provide an exhaustive list.

In the context of the invention, the term "service provider" encompasses any person, group or organisation that provides a service. It will be appreciated that the service may be any type of service and in one embodiment, the service includes, but is not limited to, a service relating to the information technologies industry. Other service providers may include, but are not limited to, accountants and accounting firms, legal firms, educational institutions and/or educators or service providers within the transport, health and hospitality industries.

It will be appreciated that a service resource encompasses one or more persons that is/are able to provide support, technical or otherwise, in order to resolve an incident. In an embodiment, a service resource includes one or more service technicians. In other embodiments, a service resource may be an accountant, health care provider, educator or a gardener. Accordingly, the term "service resource" has a broad meaning within the context of the present invention.

Each service resource will be associated with one or more criteria such that a particular service request is able to allocated, or made available to, a particular service resource that meets one or more minimum criteria. Such minimum criteria may include, but are not limited to, the charge out rate of the service resource, the experience, skill and or rating of the service resource, the qualifications of the service resource and availability of the service resource.

In an embodiment, the method of the invention further includes the step of monitoring and/or maintaining a record of a service performed by a service officer or a service resource in response to a service request. Accordingly, a service provider may monitor and record the time taken by a service officer or resource to complete a task and use the monitored content for quality assurance purposes and training of service officers and resources.

It will be appreciated that a customer within the context of the invention may include any number of persons including but not limited to, a single person, a group of two or more persons, an institution, for example, a hospital or an educational institution or a corporation.

In an embodiment, where the customer is a single person, the customer may submit a request, either online or by telephone for example, in relation to one or more incidents. Such incident(s) may arise on, for example, a personal computer.

In an embodiment, where the customer is a corporation, the customer may have a plurality of computers that are located in a single location or alternatively, are located in a range of locations of which the technical maintenance and support is the responsibility of the service provider in accordance with a service level agreement. In this embodiment, the service provider may submit a plurality of service requests at the same time and have a plurality of pending service requests awaiting service by the service provider.

It will be appreciated that in embodiments, whether the customer is a single person, a group of two or more persons, an educational institution or a corporation, any technical support provided to the customer may be administered in accordance with a level of service agreed between the customer and the service provider. In an embodiment, the level of service is administered by way of a service level agreement, the terms of which are maintained within a service requirement data structure associated with the system of the invention.

Embodiments of the invention also allow the service provider to monitor the progress of a service request and monitor and assess the quality of service that a service officer or resource provides in response to a service request.

The system of the invention may execute computer instruction code in the form of a single application or alternatively, a distributed application. In an embodiment, the system is publicly accessible operating on a secure third party cloud provider platform. However, in other embodiments, the system may be a private application operating on a private cloud or organisation specific data center with restricted user access.

In another aspect, the present invention provides a computer readable medium storing one or more instructions that, when executed by one or more processors associated with an expert guidance system, cause the one or more processors to, activate or deactivate components of a request resolution data structure, wherein the activation or deactivation of components is effected according to a customer plan that includes an inventory data structure detailing inventory of a plurality of customers, wherein the customer plans are maintained in a plan maintenance system component; and wherein the request resolution data structure is maintained in an expert guidance maintenance component and includes possible actions to resolve one or more requests in respect of items of inventory detailed in the inventory data structure, and calculate a total priority of the requests, wherein the total priority is based upon one or more of the priorities assigned to each action, source of the request, or location.

In embodiments, the system of the invention may be purchased, licensed, or otherwise acquired, by a Company for internal use. Accordingly, the system may be used by a Company to manage service requests internally and without the need to involve, or request the services of, a Service provider that is external to the Company.

The system interface may be any conventional interface that operates on a number of devices including, but not limited to, a personal computer, laptop, mobile (smart) phone, iPad or tablet and one that allows an administrator or user to interact with and use the system of the invention. The system interface may also allow authentication of a user's credentials by requiring the user to enter, for example, a unique username and password to access the system. The system may additionally, or in the alternative, adopt a method using a randomly generated PIN verification.

BRIEF DESCRIPTION OF THE DRAWINGS

Embodiment(s) of the invention will now be described in further detail with reference to the accompanying figure(s) in which:

FIG. 5 is an illustration of a system interface in accordance with an embodiment of the present invention in which the details of an individual (customer) who reports an incident are displayed.

FIG. 6 is directed to an authorisation matrix in accordance with an embodiment of the invention.

FIG. 7 is directed to a transaction matrix in accordance with an embodiment of the invention.

FIG. 8 is an example of a plan in accordance with an embodiment of the present invention.

FIG. 9 is an example of another plan in accordance with an embodiment of the present invention.

FIG. 11 is an illustration of a system interface in accordance with an embodiment of the present invention which displays information in relation to a specific action in the dynamic expert guidance system of FIG. 10.

FIG. 12 is an illustration of a system interface in accordance with an embodiment of the present invention providing information relating to a particular service resource.

FIG. 13 is an illustration of a system interface that provides information in relation to the compliance of the service resource detailed in the interface shown in FIG. 12.

FIG. 14 is an illustration of a system interface that details a list of various actions and their assigned proficiency level that represents the required minimum level of proficiency that a service resource must have in order to attend to the action.

FIG. 15 is an illustration of a system interface that details various proficiencies of the service resource detailed in the interface shown in FIG. 12.

FIG. 16 is an example of a new (pending) service ticket in accordance with an embodiment of the present in invention.

FIG. 17 is an example of a resolved service ticket in accordance with an embodiment of the present invention.

DETAILED DESCRIPTION OF THE EMBODIMENT(S) OF THE INVENTION

For convenience, the invention will be described with respect to a particular embodiment, however it will be appreciated by those skilled in the art that the invention is not limited to this particular embodiment.

Figure 1A:
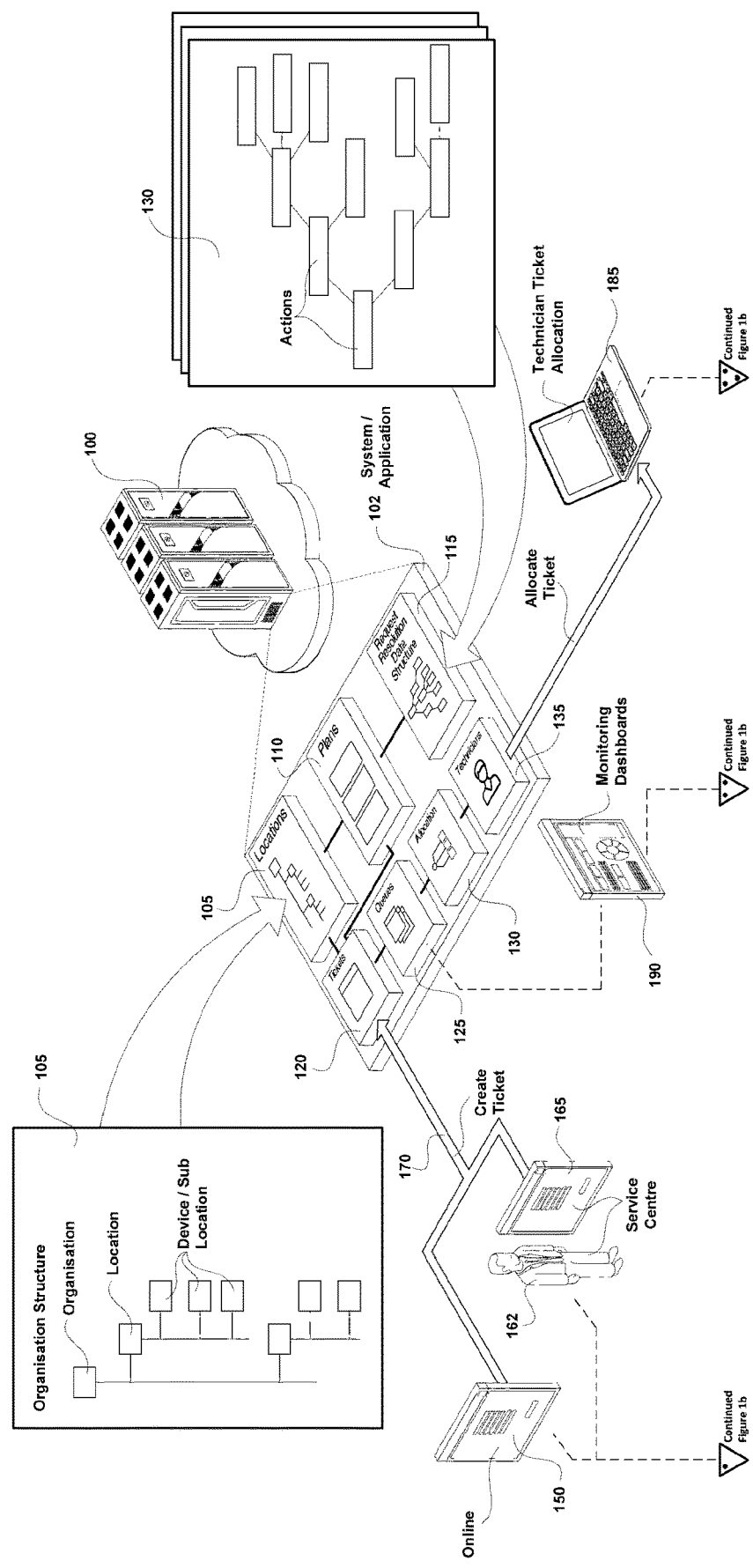
FIGS. 1a and 1b are diagrammatic representation of an overview of the system and method according to an embodiment of the invention.
Figure 1B:
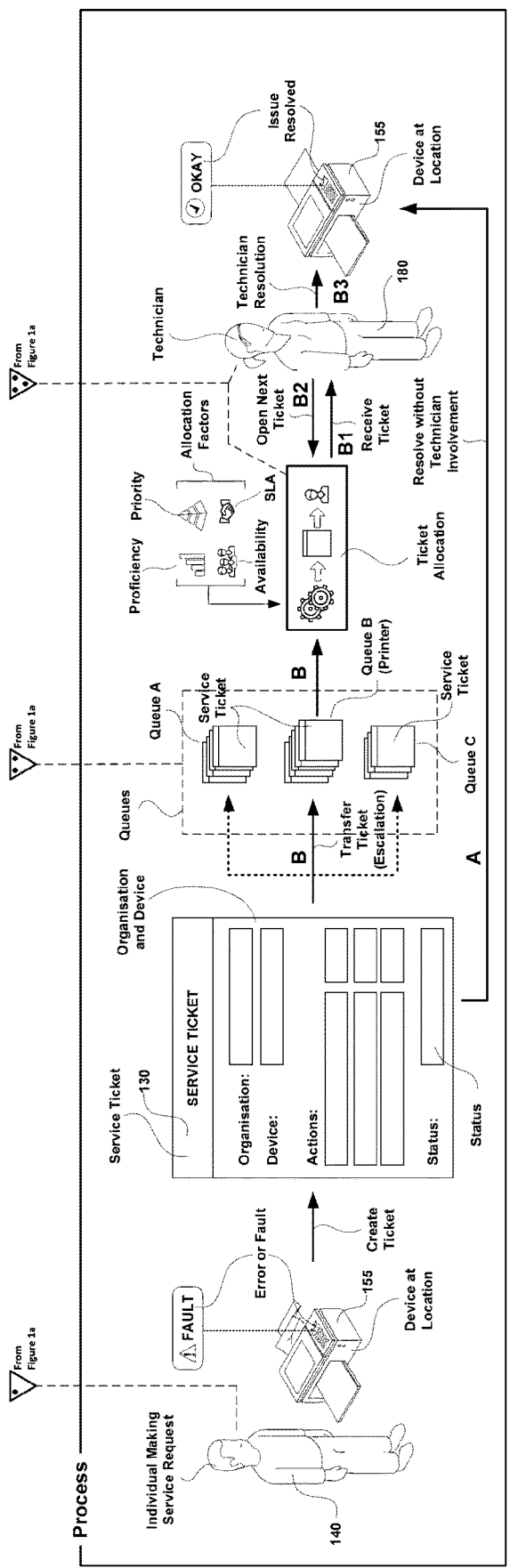
Figure 2:
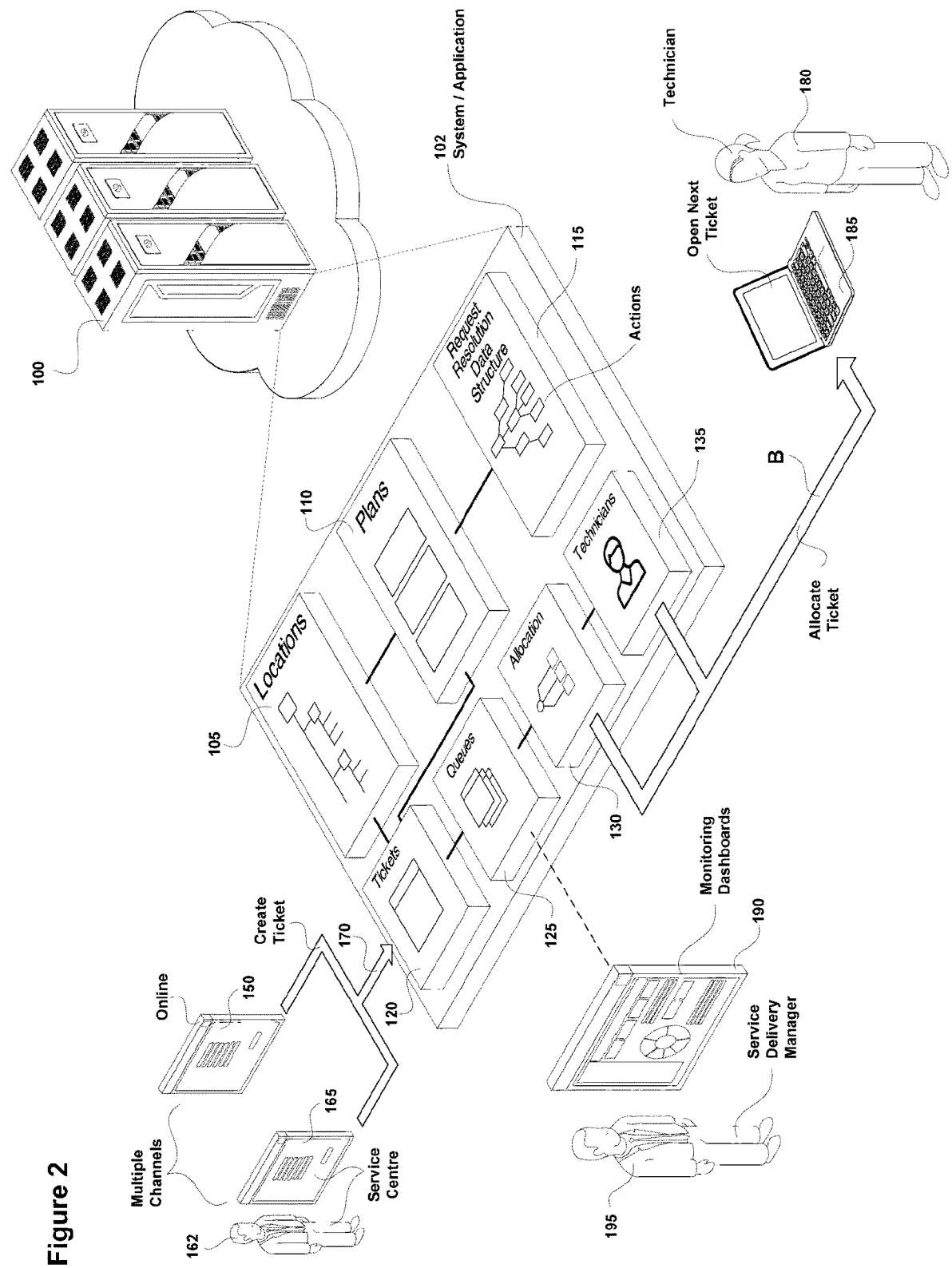
FIG. 2 is a diagrammatic representation of the steps taken by a service officer in attending to a customer service request in accordance with an embodiment of the present invention.

FIGS. 1a and 1b provide an overview of the system according to an embodiment of the invention, showing, in particular, server (100) in which application (102) includes information with respect to all customer locations and devices in location module (105) including sub-locations such as rooms and offices located within a customer's premises and any devices located therein. Accordingly, the term "location" within the context of the invention is to be broadly interpreted to encompass a physical location or address of a customer, or a room located within the customer's premises, or a device located within a specific room located within the customer's premises.

Application (102) also includes a plan maintenance component (110), including one or more processors, to maintain plans that include an inventory data structure detailing the inventory (e.g. all devices and systems and any requirements to operate such devices and systems) within a customer's organisation. Application (102) also includes a request resolution data structure (115) that includes a plurality of components, wherein each component details a set of actions pertaining to a particular device. An action, according to an embodiment of the invention, is a question to be answered by, for example, a service officer as part of any resolution process. Alternatively, an action, according to any embodiment of the invention, can be a task that a service officer is to perform as part of any resolution process.

Application (102) also stores and maintains all service tickets (120) generated by, for example, a service officer, which are maintained in one or more queues (125). Application (102) also includes one or more processors located in allocation module (130), that determine the timing of any service ticket transfer to a particular resource (for example, a service technician), wherein the transfer is according to various factors (as will be further discussed below). Application (102) also includes resource information maintenance component (135) in which information associated with each service technician employed by (or otherwise associated with a service provider) is maintained, including, but not limited to, the skill, proficiency in attending to various defined tasks, qualifications, location, availability and any other relevant details associated with each resource (for example, whether a resource can conduct on-site visits to customer premises or whether they only work remotely).

FIGS. 1*a*, *b* and 2 also detail the steps, in accordance with an embodiment of the invention, a service officer (162) undertakes in order to resolve a service request requested by customer (140). Upon submission of a service request by customer (140) in respect of an incident, for example, a fault or error with device (155), service officer (162) receives details of the service request on their system application interface (165) and generates ticket (130) in step (170). It will be appreciated that there are various options available to customers to submit a service request (for example, through an online application interface associated with the system of the invention, by telephone or by electronic mail), and in this embodiment, customer (140) submits a request through system interface (150) accessed on their computer.

Service ticket (130) includes details regarding the service request, including the source of the request (i.e., the individual that submitted the request and their location (i.e., their physical address), the device associated with the error or fault and its location, and a number of questions (actions) which are presented to the service officer as part of the resolution process. Service ticket (130) also includes the status of the service ticket i.e. whether the ticket is "pending", "allocated and queued for transfer", "resolved" or "transferred" to a service technician.

With reference to FIG. 1*b*, there are two possible pathways that a service ticket (130) may follow during a resolution process. The first path is indicated in FIG. 1*b* as Path A in which service ticket (130) is ultimately resolved by service officer (162) in the absence of any assistance or review by a service resource of higher proficiency and skill. The second path is indicated in FIG. 1*b* as Path B (and associated paths B1, B2 and B3), in which service ticket (130) is transferred to service resource (180) in the event service officer (162) is unable to resolve the service request during the initial diagnosis and resolution process.

In order to undertake an initial diagnosis and attempt at resolution of the service request submitted by customer (140) in relation to device (155), service officer (162) is prompted by a series of actions appearing on interface (165) and answers various questions and/or performs tasks that are specifically targeted and relevant to device (155). It will be appreciated that the series of actions provided to service officer (162) in relation to the service request submitted by customer (140) will be a subset of all possible actions located, and maintained in, request resolution data structure (115) and will specifically pertain to device (155). This is achieved, in one embodiment, by the use of one or more plans associated with device (155), which cause an expert guidance system (not shown) associated with the system application and that include one or more processors, to activate components within request resolution data structure (115) that are specifically relevant to device (155). The one or more plans associated with device (155) will also cause the expert guidance system to deactivate any components of request resolution data structure (115) that are not relevant to device (155).

It will be appreciated that whilst in this embodiment, one or more plans are associated with device (155), the system and method of the present invention also contemplate linking (or otherwise associating) the one or more plans with sub-locations of an organisation (for example, rooms and offices within the organisation), or even linked or otherwise associated with the organisation itself.

In the event service ticket (130) is unable to be resolved by service officer (162) during the initial diagnosis and resolution process, service ticket (130) follows the path indicated as Path B (and associated Paths B1, B2 and B3) in FIG. 1*b*. In particular, Path B illustrates the automatic escalation and allocation of service ticket (130) to a particular queue (in this instance either one of queue A, B or C) wherein each queue is associated with one or more resources meeting minimum criteria. For example, if an action is assigned a minimum proficiency of 6 out of 10 (for example), a service ticket will be allocated to a queue from which transfer can only occur to one or more resources that have a proficiency of 6 or higher.

The automatic allocation of service ticket (130) to a particular queue is dependent upon a number of factors that are entered, stored, updated and maintained in system application (102) located within server (100). Such factors include, but are not limited to, the assigned proficiency of a particular action (i.e., the minimum proficiency assigned to a particular question or task that defines the minimum proficiency level of a service resource to attend to that action), the minimum criteria of the resource (including, but not limited to, skill, experience, proficiency and compliance of the resource), the assigned priority of the ticket, the availability of the service technician and also the terms of any service level agreement between the customer that submitted the service request and the service provider.

FIGS. 1*a*, *b* and 2 also show monitoring device (190), used by service delivery manager (195) associated with a service provider to ensure no service tickets are missed or remain any a queue for a period of time that exceeds any assigned priority or service level requirements of a customer. Service delivery manager (195) can also use monitoring device (190), to review the history and progress associated with any service ticket.

Upon allocation of service ticket (130) to queue B, service technician (180) accesses system application (102) through an electronic communications device (not shown) such as a laptop, computer, smartphone, tablet etc., and indicates, by selection of an electronic option, that they are ready to receive and accept the next service ticket in the queue.

In an embodiment, service technician (180) is allocated and receives service ticket (130) in the absence of having any knowledge regarding the details of the service request submitted by customer (140). Accordingly, service technician (180) will see only minimal details associated with service ticket (130) at the time of allocation, wherein such minimal details may include the time the pending request was generated and the details regarding the origin of the service request, (i.e., the details of customer (140)). Once technician (180) accepts service ticket (130), all relevant details, including the service history of the steps undertaken by service officer (162) during the initial diagnosis and resolution process, will be revealed to service technician (180).

Once service technician (180) accepts and gains access to service ticket (130), service technician (180) is able to view the details of the ticket, the service history regarding the steps and actions undertaken by service officer (162) in an attempt to initially resolve the service ticket, and any requirements associated with resolving the ticket. In this regard, since the system of the invention according to an embodiment is configured to enable a complete history of the initial resolution process to be recorded and maintained within the system server, a service resource (for example, a technician) is able to consult the service history captured within a service history data structure of the system application (not shown) thereby avoiding, or at least reducing the likelihood, that a service resource would any actions already attended to by the service officer during the initial resolution process. This has the associated benefit of reducing the time to resolve a service ticket in addition to assisting the service provider to meet the terms of any service level agreement existing between the service provider and the customer.

Once service ticket (130) is accepted by service technician (180), the system only allows a service technician (180) to accept the next pending service ticket once the service request associated with service ticket (130) has been resolved and/or the service ticked has been marked as "completed". Accordingly, withholding at least some of the details associated with service tickets from service resource (130) avoiding the situation where the service resource declines a service ticket associated with a service request on the basis of preference.

In the event service technician (180) is able to resolve the service request associated with service ticket (130), service ticket (130) is marked as "completed" and closed. However, in the event service technician (180) is unable to resolve the incident associated with service ticket (130), service technician (180) is required to provide a reason why the service request associated with service ticket (130) was unable to be resolved, and this reason will be recorded as part of the service history of the resolution process associated with service ticket (130). In particular, service technician (180) is required to record the details of any steps undertaken in order to resolve ticket (130), and also indicate any factors that have hindered the technician's ability to resolve the ticket. Such factors could include, for example, the inability to access certain parts of the customer's site in order to resolve the ticket, or alternatively, the inability to obtain any parts that are required to repair the error or fault associated with device (155). Under these circumstances, the ticket will follow Path B2 back to queue B and await further action by service technician (180) at a later date or another service technician that has a higher skill and/or proficiency compared to service technician (180) that initially accepted service ticket (130).

Figure 3:
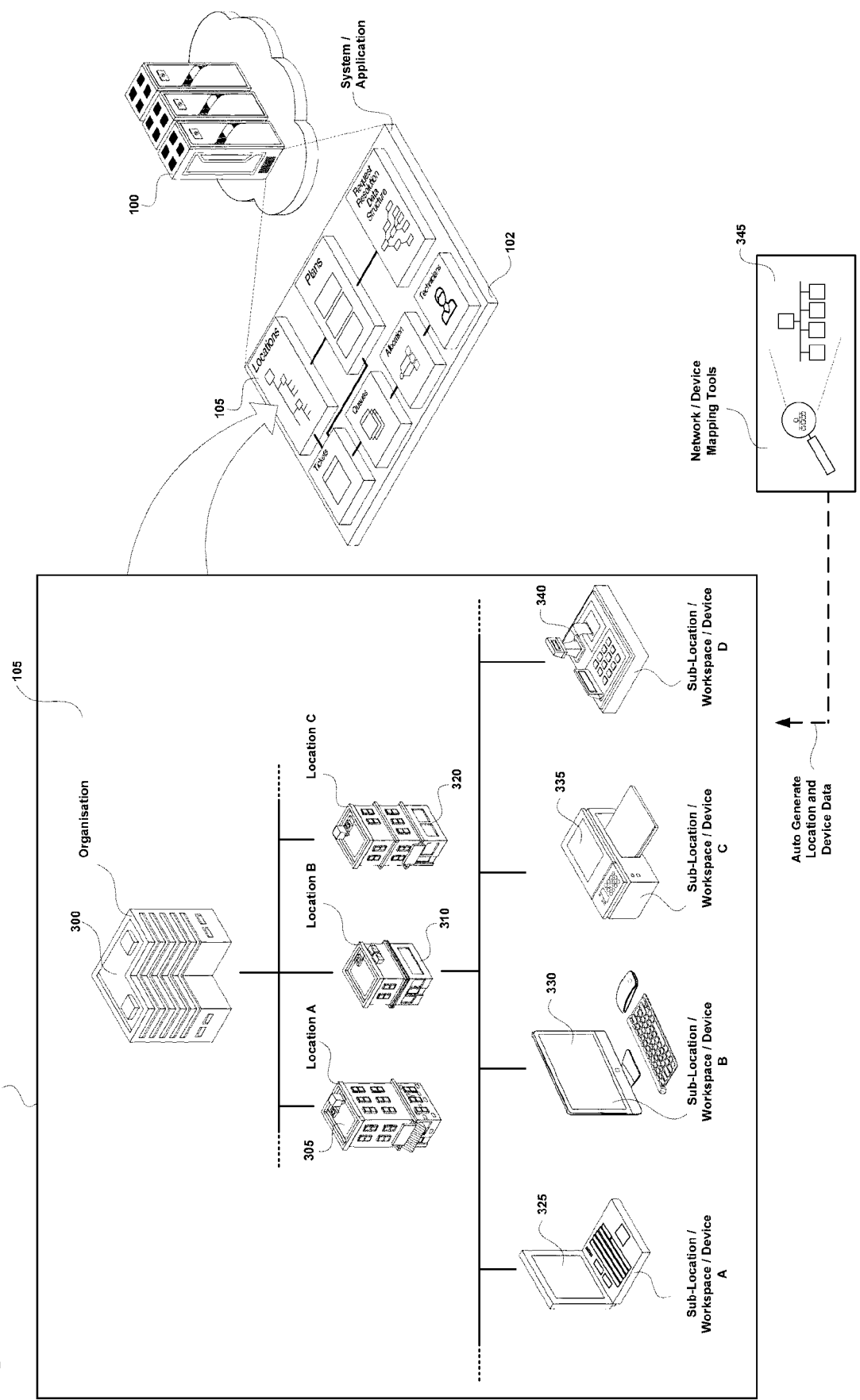
FIG. 3 is a diagrammatic representation of the definition of a "location" within the context of the invention and how items of inventory may be associated with a customer location and stored within the system application in accordance with an embodiment of the invention.

FIG. 3 is a diagrammatic representation of how different parts of the organisation (customer) and any associated items of inventory may be identified and stored within location module (105) of system application (102) in accordance with an embodiment of the system and method of the present invention. In particular, FIG. 3 details a typical organisation structure which is illustrated, in this embodiment, in hierarchical order comprising the location of an organisation as a whole at the top level followed by sub-locations A, B and C of the organisation that represent offices of the organisation located at different locations (for example, different cities). FIG. 3 also details various devices A, B, C and D located at Location B, including, respectively, laptop (325), computer (330), printer (335), and Point of Sale (POS) machine (340). Accordingly, organisation (300), sub-locations A, B, C and D and Devices A, B, C and C all represent "locations" within the context of the present invention, to which one or more plans may be applied, linked or otherwise associated.

Figure 4:
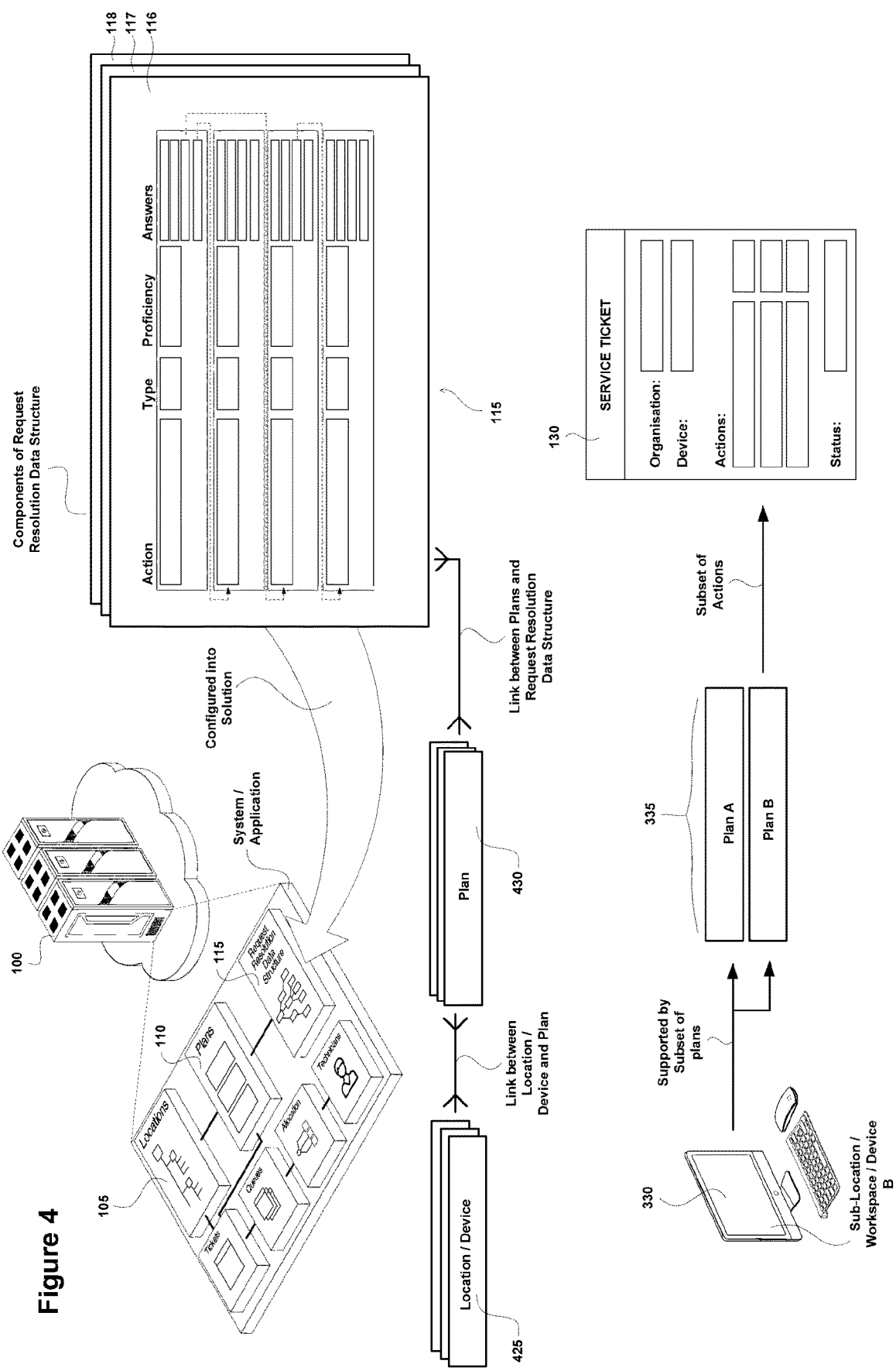
FIG. 4 is a diagrammatic representation showing how locations (devices) and plans maintained within the system of the present invention, according to any embodiment, are linked and interact in order to generate a list of required actions pertaining to a service request submitted by a customer.

The association between plans and locations is shown more clearly in FIG. 4, in which device B (computer (330)) is associated with two plans (A and B) (335) stored in plan maintenance component (110) within system application (102) located in server (100). Plans A and B, associated with device B (computer (330)), cause expert guidance system to activate and/or deactivate components of request resolution data structure (115) in order to generate a set of actions (questions and/or tasks) that are relevant to device B (computer (330)). Accordingly, any actions within request resolution data structure (115) that do not pertain to device B will not appear in service ticket (130) generated by service officer (162). It will be appreciated that the application of one or more plans to a location (whether the location refers to an organisation location, sub-location or a particular device or system within the organisation, not only eliminates any unnecessary actions being displayed to a service officer during the initial diagnosis and/or resolution process (thereby avoiding asking customers any questions that are not relevant to their submitted service request), but also reduces the amount of time and cost associated with a resolution process.

It will be appreciated that the embodiment described with reference to FIGS. 1 to 4 refers a customer that submits a request, however, it will be appreciated that in other embodiments, a request may be submitted by an employee of a service provider (e.g., an Information Technology firm) who is able to accept a service request from a customer by, for example, telephone, email or some other means. Accordingly, a user within the context of the invention may be a person that reports an incident, or may be a person that attempts to resolve the incident. In some embodiments, the user that reports the incident is also the user that attempts to resolve the incident.

Whilst not contemplated in FIGS. 1 to 4, an alternative embodiment, a service request may be automatically initiated by the system through continuous or periodic monitoring/surveillance of one or more devices within a customer's premises. Accordingly, when the monitoring/surveillance system of the invention identifies and/or records a fault with a device, the system will automatically log a service request and/or generate a service ticket.

In order to submit a service request and generate a service ticket (130) a user (in this case customer (140) (which may be an individual or a company)), enters the system using an electronic communications device, for example, a smartphone, tablet, computer or laptop, and accesses a web-based application associated with the system of the invention by entering a username and password using an interface of which an example is shown in FIG. 5. Alternatively, customer (140) can simply log a service request by means of a telephone call or an electronic mail. As can be seen from FIG. 5, in addition to the username and password of customer (140), the first name, surname (last name), land line telephone number, mobile telephone number, email address, role and position of the user within the Company (in the case customer (140) is a representative of the Company) are also entered and recorded in the system database. The system according to an embodiment also allows additional notes to be entered against the name of customer (140) if required, for example, the amount of expenditure customer (140) is able to authorise with respect of any service request. In the event the user is a first time user, all of the user's information is stored and saved into the system so that if the same user accesses the system in future, the user will be recognised by the system and their details will be automatically recalled.

Once a service request has been submitted by customer (140), service officer (162) is prompted to select a particular incident (that may at times be posed in the form of a question) from the list of available incidents/questions that are specified as part of a plan associated with a particular device located within the Company of customer (140). Once the service request has been submitted, the system checks whether customer (140) is authorised to submit the service request in respect of the particular incident and if so, the diagnosis and initial resolution of the service request proceeds.

In the event customer (140) does not have sufficient authority to submit the service request, the system whether another individual with sufficient authority to approve the request is able to be identified, and if not, the service request is allocated for manual processing. At this point, the service request may be discussed with a relevant person of the Company (for example, the Managing Director) in order to progress the service request.

As an aside, whether a particular user is authorised to submit the request will typically depend on the anticipated service time or budget considerations associated with resolving a particular incident. For example, if the service request is associated with an incident that will require a substantial amount of time and/or expenditure to resolve and the anticipated time and/or expenditure is above the authorised limit of the user that submitted the request, the system will check to find the next person within the company having sufficient authority to approve the service request.

An example of how the system keeps track of a person's authorised limit is shown in the authorisation matrix of FIG. 6 which identifies four positions within a particular Company (Default, SDM (Service Delivery Manager), MD (Managing Director) and OM (Operations Manager)). In the example shown in FIG. 6, it can be seen that all positions within the Company have authority to submit both offsite and onsite service requests after hours however the MD is the only individual having the authority to approve Capital Expenditure (CAPEX) and also has the authority to approve service requests requiring up to 20 hours of service time and tickets totaling up to $999999. Both the SDM and OM have the authority to approve tickets totaling up to $100000 and any employee in the Default position has authority to request total ticket expenditure of $300.

In the event an individual with sufficient authority to approve the request is identified and the individual does not approve the request, the system may be updated so that it marks the service request as "cancelled". Alternatively, in the event the service request is approved by an individual having sufficient authority to approve the request, the system then checks whether the service request is able to be completed within various requirements including any requirements agreed within the context of a Service Level Agreement (SLA) existing between the Customer and the Service Provider that provides the technical support. It will be appreciated that this step involves the system checking various requirements including, but not necessarily limited to:

Priority/operating hours—i.e., Can the incident be accommodated at a particular time of day?

Budget—i.e., Can the incident be resolved within the approved authority?

Proficiency/compliance—i.e., Does the service resource have an adequate/approved proficiency and/or qualifications to resolve the issue?

Policies—i.e., Do any policies such as awards, regulations or union policies apply that prevent the resolution of the incident by the service resource?

In order to check whether a service request is able to be resolved within all of the set requirements, the system checks various elements associated with each and every pre-defined question that is posed to a service officer in an attempt to resolve the incident associated with the service request. In this regard various pre-defined information associated with a particular pre-defined question (incident) checked by the system may include, but is not limited to:

the set and/or required time for completion of the task in order to resolve the question(s) associated with an incident;

the required minimum proficiency and qualifications (compliance) of a user to complete the task in order to resolve the question(s) associated with an incident;

whether the question(s) can be actioned/completed off-site or whether an on-site visit is required;

the assigned sub-priority of question(s) associated with an incident.

In order to check whether a particular service request can be completed within a specified or agreed budget, the system of the invention according to an embodiment adopts the use of a "transaction matrix". FIG. 7 provides an example of a transaction matrix in accordance with an embodiment of the present invention that sets out the rates at which various tasks/service requests are charged within a particular plan and also assigns a General Ledger (GL) code to a particular transaction within an accounting platform associated with the system.

As can be seen from FIG. 7, the Plan type ("Pro") is specified in addition to the different billing rates associated with the type of transaction (i.e., whether the transaction is onsite or offsite). Also specified in the Transaction Matrix shown in FIG. 7 are the applicable billing parameters per transaction type:

Time period (i.e., rates are charged per minute, per 5 minutes, per hour etc)

Minimum charge period (i.e., 60 minutes or part thereof)

Whether any free time applies (i.e. first 10 minutes)

In the event the service request is able to be completed within all set requirements associated with the existing service level agreement between the customer and service provider, and the initial service resource (for example, a service officer within a call centre) has the necessary proficiency to attend to the request (or a particular action associated with the request), the system generates one or more actions that require answering/completion by the service officer. Once the service officer responds to a posed action, the system checks whether the incident associated with the service request is able to be resolved as a result of responding to the previous action. In the event the incident is resolved, the system is updated so that the service request is marked as "resolved". However, in the event the incident remains unresolved, the system checks to see whether there are any further actions that may be posed in an attempt to resolve the incident.

In the event there are further actions, the system generates further actions to be answered/completed by the service officer and the system then repeats all of the required checks between the generation of each action to ensure the next action meets all requirements including whether the action still falls within the scope of proficiency of the service officer, and also whether completion of the action falls within the authority of the individual that submitted the request.

In an embodiment, and as part of the ticket generation process, the system also determines a total priority to be assigned to the service ticked based upon a combination of the assigned sub-priorities of the contact (the person submitting the request), the required actions associated with the service request and the location of the incident. In the event the service ticket is not able to be resolved within a predefined time period associated with the total priority the service ticket within the initial diagnosis/resolution process, the service ticket is queued for allocation to one or more service resources meeting one or more minimum criteria selected from, but not limited to:

Availability—i.e., is the service resource available to attend to the service ticket within the required and/or predefined period;
Proficiency—i.e., does the service resource have the required minimum proficiency rating based on skill and experience;
Compliance—i.e., does the service resource have the required minimum compliance based on training and qualifications;
Budget—i.e., does the service resource have an appropriate charge rate such that the service request is able to be resolved within any agreed or set budget.

As previously described, plans within the context of the invention may be defined quite specifically to be applicable to a specific device or may be more broadly defined and applied, for example, to a particular organisation or one or more locations associated with an organisation. For example, a plan according to an embodiment of the invention may be specifically defined to be applicable to a particular device running an Apple Operating System (e.g., Mac OS 8) or may, alternatively, be more broadly defined to apply to a Customer and all of its franchisees or subsidiaries. In an embodiment, a plan may be tailored to suit the requirements of a particular Company. Accordingly, plans can be directed to particular devices, and a particular Customer plan may be comprised of a plurality of plans directed to various devices that match the inventory of a particular customer. Whilst a plan is not generally specific to a company (or customer) it can be, and in embodiments, plans are designed and adapted so that they may be used in as many locations (i.e., with respect to customers or devices) as possible.

FIG. 8 provides an example of a plan that includes specific questions that are relevant only to a device executing Windows 2012 R2 operating system. Accordingly, if a company has one or more devices on which Windows 2012 R2 is installed and configured, the company may elect to have the plan shown in FIG. 8 as part of their Service Level Agreement so that a user, when logged into the system, will be presented with various actions (questions and task) relevant to devices executing Windows 2012 R2 software, examples of which are shown in the plan of FIG. 8.

FIG. 9 provides another example of interface that details a plan ("Pro") that accommodates broader actions that are applicable to a number of devices on which various Operating Systems are installed and configured. In the plan shown in FIG. 9, in addition to the actions provided in relation to various incidents for which a Company may require support, the plan also specifies (as shown in the top-most cells of the interface shown in FIG. 9) that a $45 monthly support maintenance fee that is charged to the Company on the $1^{st}$ day of each month.

It will be appreciated that the plans presented in FIGS. 8 and 9 are merely examples of possible plans that a company (customer) may have defined as part of any Service Level Agreement between the company and the service provider. It will also be appreciated that a company, in embodiments, may have one or more defined plans to suit their technical support requirements. In this regard, a company may have individual plans associated with any device located within the Company or may have a single plan that is associated with all devices within the Company.

In embodiments, each plan is associated with a list of devices in respect of which a subset of all possible actions within a request resolution data structure apply. In embodiments, each plan also has associated information that assists in defining how a service request is to be accommodated and how an incident is to be resolved. The list of devices in combination with any additional information define how much time and expenditure will be required in order to resolve the incident by attending to a plurality of actions.

Figure 10:
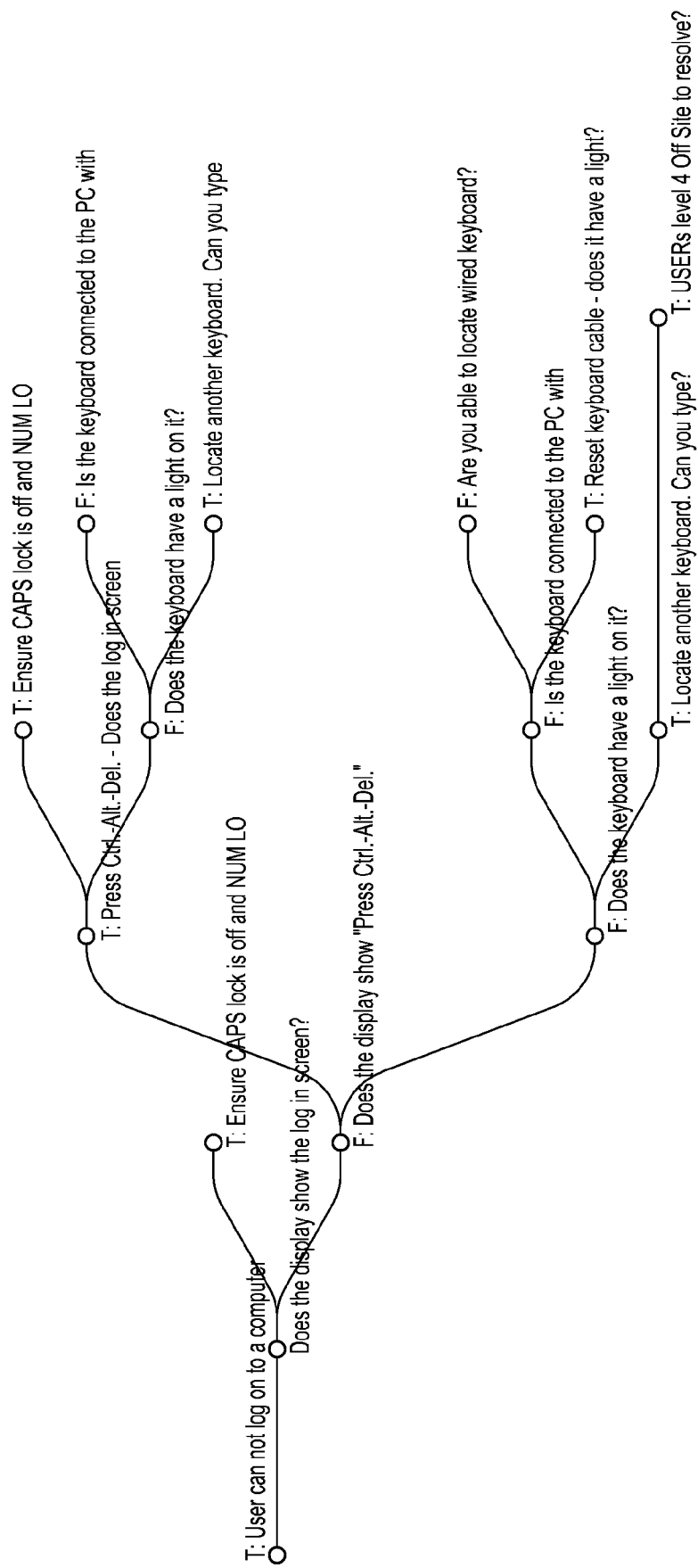
FIG. 10 illustrates a section of the request resolution data structure in accordance with an embodiment of the invention that shows specific actions (questions).

For example, and with reference to FIG. 10, a diagrammatic representation of a subset of the request resolution data structure in accordance with an embodiment of the invention is provided that illustrates a series of pre-defined actions (questions and/or tasks) that logically flow from an initial incident ("User cannot log onto a computer") related to a particular device.

Referring to FIG. 11 which focusses on the second question of the subset of the request resolution data structure shown in FIG. 10 ("Does the display show "Press Control-Alt-Del""), it is evident that this particular question has a number of associated elements: a code (Q_000000970), the activity type required to resolve the question ("Off Site"), the required minimum proficiency of the user (service officer) to attend to the action ("2", where "0" is the lowest proficiency and "6" is the highest proficiency), the minimum compliance(s) of the Service Technician required to answer the question ("[Business Equipment Award] Level 1 Technician"), the time required to answer the question ("5 seconds"), the assigned sub-priority associated with the question ("50" where a priority of "0" is the lowest priority and "100" is the highest priority) and the next question in the event the answer to the question is true ("Press Ctrl-Alt-Del—Does the login screen show?"), and the next question in the event the answer to the question is false ("Does the keyboard have a light on it?").

It is evident from FIGS. 10 and 11 that the system of the invention according to an embodiment is based upon the provision of a series of actions posed in response to an initial service request for an incident that assist in achieving resolution of the incident. In order to streamline, focus or otherwise direct the number and type of actions that may be provided by the system to a user (for example a service officer) at any given time, the system adopts the use of one or more plans which detail items of inventory associated with a customer to thereby generate actions that pertain to the service request submitted by the customer.

Accordingly, with the use of one or more plans directed to a particular customer and/or one or more devices (i.e. items of inventory of a customer), it is possible to achieve a finite number of the actions pertaining to a particular incident. In the event an incident/problem or action is identified that has not previously been considered and defined, the new incident/problem or action may be entered and stored within the system such that the new incident/problem or action is made available to assist in resolving future incidents. Accordingly, the system of the invention is able to be developed and evolves over time based on prior incidents and previous experience.

In the event a service request associated with a service ticket is unable to be resolved by a service officer during the initial diagnosis/resolution process, the service ticket is allocated to a queue prior to transfer to a service resource that will have the necessary proficiency, compliance and availability to attend to the service ticket. FIG. 12 provides an example of a system interface that permits information relating to each service resource employed by (or otherwise associated with) a service provider to be entered and stored within the system application of the present invention. As can be seen from FIG. 12, the first name/initial ("P"), surname (last name) ("Smith"), user name and password of a service resource are stored on the system in addition to the contact details (landline and mobile telephone numbers and email address) of the service resource. The Position ("Service Technician") and Role ("Service Support") of the service resource are also recorded. FIG. 10 also shows tabs "Compliance", "Action Proficiency" and "Proficiency Matrix" (refer to FIGS. 13, 14 and 15) that include information relating to the rating, skill and qualifications of, or required by, a service resource.

In this regard, FIG. 13 the details the "Compliance" tab that shows a particular service resource having a Business Equipment Award and that is a Level 2 Technician whilst FIG. 14 details the "Action Proficiency" tab that displays an assigned proficiency to various actions. It will be understood that the assigned action proficiency is the minimum proficiency level required by a service resource to attend to that particular action. FIG. 15 displays the proficiency of service resource P. Smith (see FIG. 10) with respect to completing various actions within various Categories. For example, P. Smith has a proficiency level of "6" for attending to actions within the "Audio & Visual Category" (amongst other categories shown in FIG. 15) relating to different activity types "3$^{rd}$ Party Liaising", "Labour 3$^{rd}$ Party AV", "Labour 3$^{rd}$ Party CCTV" etc.

In an embodiment, in the event a service resource does not have the required proficiency to attend to an action, the service ticket is returned to the queue and re-allocated for transfer to an alternative resource that has the required minimum proficiency for that particular action.

Accordingly, the system of the invention is able to interrogate the stored information located within the system with respect to each service resource and automatically allocate a service ticket to a queue for access by one or more service resources that meet various minimum criteria.

As previously discussed in respect of an embodiment of the present invention, once a service ticket is created, and in the event the service ticket requires allocation and transfer to a service resource that meets various minimum criteria specified in any Service Level Agreement or within any relevant policies (e.g., Union policies, legal/compliance policies etc.), the system allocates a total priority (anywhere between a priority level of "41,648" and "1" where "41,648" is the highest total priority and "1" is the lowest total priority) to the pending task that will, in part, determine the one or more service resources to which the pending task will be allocated or made available. It will be appreciated that the total priority determined for a service ticket may depend on any number of requirements within a Service Level Agreement between the Company (Customer) and the Service Provider.

In an embodiment, the "total" priority depends upon a combination of any one or more sub-priorities that may be established according to rules or assignment. For example, a total priority could be determined from a combination of sub-priorities including the individual that submits the request, the nature of the incident and the location of the incident. According to an embodiment, the total priority depends upon the priority level (anywhere from 0 to 100) assigned to the Contact (i.e., the person who submits the request), the priority assigned to a particular Question (i.e., the particular question proposed to resolve the incident) and the priority assigned to the Location (i.e., the location of the incident). For example, a service level agreement may specify that all requests submitted by the Managing Director of a Company are to be assigned a priority level of 100 whereas a service request submitted by any other employee of the Company is to be assigned a priority level of 50. Accordingly, each Contact, Question and Location forming sub-priorities are assigned a priority level within 0 to 100 which may be used to determine the Total Priority of a pending task.

In an embodiment, the total priority of a pending task may be determined according to the following relationship:

$$\text{Total\_Priority} = \text{Contact\_Priority} * \text{Location\_Priority} * \text{Question\_Priority} * 0.001 * 0.48, \text{ when the calculated Total Priority} \le 125.$$

However, when the calculated Total Priority >125, then the Total Priority is instead determined according to the following relationship:

$$\text{Total\_Priority} = (\text{Contact\_Priority} * \text{Location\_Priority} * \text{Question\_Priority} * 0.001)^{(((((\text{Contact\_Priority} * \text{Location\_Priority} * \text{Question\_Priority} * 0.001) - 125) * 0.0022857142857143) + 1)} * 0.48 * 0.001));$$

Alternatively, in another embodiment, the total priority of a pending task may be automatically determined by the system according to various weighted relationships depending on whether the priority is to be weighted according to importance (i.e., the assigned priority) of the Contact, Question or Location as follows:

Weighted by Contact

If Contact_Priority ≤50:

$$\text{Total\_Priority} = (\text{Contact\_Priority} * 0.1) * (\text{Location\_Priority} * 0.1) * (\text{Question\_Priority} * 0.1)$$

If Contact_Priority >50:

Total_Priority=(((Location_Priority*0.1)*
(Question_Priority*0.1))*(Contact_
Priority*0.1)$^{(((Contact\_Priority*0.1)-5)*0.4)+1)*0.48}$ Weighted by Question
If Question_Priority is ≤50:

Total_Priority=(Contact_Priority*0.1)*(Location_Priority*0.1)*(Question_Priority*0.1)

If Question_Priority >50

Total_Priority=(((Location_Priority*0.1)*
(Contact_Priority*0.1))*(Question_Priority*
0.1)$^{((((Question\_Priority*0.1)-5)*0.4)+1)*0.48}$ Weighted by Location
If Location_Priority is ≤50:

Total_Priority=(Contact_Priority*0.1)*(Location_Priority*0.1)*(Question_Priority*0.1)

if Location_Priority >50

Total_Priority=(((Question_Priority*0.1)*
(Contact_Priority*0.1))*(Location_Priority*
0.1)$^{((((Location\_Priority*0.1)-5)*0.4)+1)*0.48}$ Once the total priority is automatically determined by the system, the system checks the authorisation matrix and whether the service request/pending task is able to be accommodated within the requirements of any Service Level Agreement (SLA) existing between the customer and the service provider. If the request is not properly authorised, or is unable to meet the SLA requirements, the service ticket is allocated for manual processing. However, if the service ticket is properly authorised and is able to be accommodated within the requirements of any SLA, the system then identifies any service resources of the service provider that meet various minimum criteria.

If a service resource that meets all minimum criteria is unable to be identified, the service ticket is placed on hold until an appropriate service resource becomes available. If one or more service resources that meet the minimum criteria is/are identified, then the service ticket is automatically made available to the one or more service resources that meet all minimum criteria.

In an embodiment, the system is configured such that a service resource that meets all minimum criteria must necessarily select the next service ticket from a list of service tickets that have been made available to the resource. It will be appreciated that this will assist in avoiding, or at least minimising, a service resource "picking and choosing" a service ticket which, in the context of the present invention, "picking and choosing" is the tendency of service resources to select service tickets that are perceived as being easy to resolve or require less time to resolve as compared with other service tickets. It will be appreciated that "picking and choosing" service tickets is undesirable from an efficiency and client management perspective, since service tickets can be left languishing for days and sometimes weeks or months, if they are perceived to be difficult and/or time consuming to resolve. In order to further reduce the tendency of "picking and choosing" service tickets by the service resources, in embodiments, the system is configured so that only minimum details of any service ticket are initially provided to the service resource, wherein the full details of the service ticket are only provided once the service ticket is selected and opened by the service resource, thereby confirming acceptance of the service ticket by the service resource(s).

Once the service resource selects the next service ticket and the system generates an action (or actions) for attention by the service resource, the service resource attempts to resolve the service request after which point the service request will either be resolved or unresolved. If the service request is resolved, the service ticket is updated so that the service ticket and service request is marked as "closed".

FIG. 16 provides an example of a service ticket as displayed to, and viewed by, a service resource once selected by the service resource. As can be seen from the service ticket interface shown in FIG. 16, on the right hand side of the service ticket, various information relating to the service request is provided including the Customer name, the name of the person that recorded the incident, the contact details of the person who reported the incident, the priority of the service ticket, the source of the service request (i.e., in the embodiment shown in FIG. 16 the service request was submitted by "John Brown" by phone), the due date and time of the service ticket, the SLA time of the incident and details of the service resource who created the service ticket. FIG. 13 also shows the title of the service request ("User cannot login to windows") and also shows the question history and next action (question) that is to be considered by the service resource requiring the input of a "yes" or "no" response.

The system and method of the invention, according to an embodiment, may also provide means to record the time taken to complete an action and/or service ticket by the service resource. In this regard, FIG. 17 shows a completed service ticket in respect of the incident "Email stuck in outbox" and a list of logical actions (questions) that follow from the initial service request. As can be seen by inspection of FIG. 17, the service request was submitted by Bob White (an employee of the customer (Henry Jones & Associates)) and the service ticket was created by John Jones (a Service Technician of the service provider). The service ticket of FIG. 17 also shows the time the service provider expects the service resource to complete each question and also shows the actual time ("Real Time") it took for service resource John Jones to attend to completion of each action. Therefore, the system and method according to embodiments of the invention also permits the performance of any service resource to be monitored, tracked and assessed for quality assurance purposes, or, for training/improvement purposes of service resources.

It will be appreciated that since the system and method according to embodiments of the invention effectively diagnose an incident prior to allocation to a service resource, it is likely that increased efficiency and success in solving service tickets will be realised since allocation of pending tasks to service resources that do not meet minimum qualifications, experience and proficiency will be avoided. This therefore facilitates a service provider in meeting its contractual obligations with a customer, in accordance with any terms of a service level agreement between the customer and the service provider.

The reference to any prior art in this specification is not, and should not be taken as, an acknowledgement or any form or suggestion, that the prior art forms part of the common general knowledge.

Throughout this specification and the claims which follow, unless the context requires otherwise, the word "comprise", and variations such as "comprises" and "comprising", will be understood to mean the inclusion of a stated integer or step, or group of integers or steps, but not the exclusion of any other integer or step or group of integers or steps.

The claims defining the invention are as follows:

1. A service request resolution system for resolving one or more issues associated with requests from a plurality of customers, the system comprising:
   a plan maintenance component comprising one or more processors to maintain plans that include an inventory data structure detailing inventory of the plurality of customers, the inventory being identified and maintained within the inventory data structure by an inventory mapping tool;
   an expert guidance maintenance component comprising a request resolution data structure including possible actions to resolve the one or more requests in respect of items of inventory detailed in the inventory data structure;
   an expert guidance system comprising one or more processors operable to dynamically activate and/or deactivate components of the request resolution data structure, an activation or deactivation of components effected according to a plan of a customer of the plurality of customers, wherein:
      each action within the request resolution data structure is assigned a priority, each source of the request is assigned a priority, and each location associated with each source of the request is assigned a priority; and
      one or more processors calculate a total priority of the request, with the total priority based upon one or more of the priorities assigned to each action, source of the request, or location; and
   one or more processors operable to determine a resource of a plurality of resources to which a service ticket for resolving an issue associated with the request is to be allocated, wherein the resource is allocated the service ticket in the absence of being provided details of the issue.

2. The service request resolution system of claim 1, wherein each action defined within the request resolution data structure is assigned a proficiency.

3. The service request resolution system of claim 1, wherein the assigned proficiency is a minimum proficiency that a resource of the plurality of resources must have to attend to each action.

4. The service request resolution system of claim 1 wherein each action is either one of a question pertaining to the request or a task that requires execution as part of a resolution process.

5. The service request resolution system of claim 1, where the system further comprises a customer service requirement maintenance component in which a service requirement data structure is maintained, the service requirement data structure defining one or more service requirements with respect to each customer.

6. The service request resolution system of claim 1, wherein the inventory data structure is operable to be updated to include additional inventory or delete existing inventory.

7. The service request resolution system of claim 1, wherein the system comprises a tracking system having one or more processors operable to maintain a service history in a service history data structure.

8. The service request resolution system of claim 1, wherein the system further comprises a resource information maintenance component comprising one or more processors to maintain a resource data structure comprising the plurality of resources available to resolve requests in respect of items of inventory.

9. The service request resolution system of claim 1, wherein the expert guidance system comprises one or more processors operable to dynamically activate or deactivate one or more of the plurality of resources within the resource data structure according to one or more minimum criteria associated with each resource.

10. The service request resolution system of claim 9, wherein the one or more minimum criteria include one or more of skill, proficiency, compliance, experience and availability of the resource.

11. The service request resolution system of claim 1, wherein allocation of the service ticket is based upon the request in combination with one or more of the following:
   the request resolution data structure in which one or more components are activated and/or deactivated according to the plan of the customer;
   the resource data structure in which one or more resources are activated and/or deactivated according to one or more minimum criteria associated with each resource;
   the calculated total priority of the request; and
   one or more service requirements maintained within a service requirement data structure pertaining to the customer associated with the request.

12. A computer readable medium storing one or more instructions that, when executed by one or more processors associated with an expert guidance system, cause the one or more processors, in response to a service request, to:
   activate or deactivate components of a request resolution data structure, wherein activation or deactivation of components is effected according to a customer plan that includes an inventory data structure detailing inventory of a plurality of customers, the inventory being identified and maintained within the inventory data structure by an inventory mapping tool. wherein:
      the customer plans are maintained in a plan maintenance system component; and
      the request resolution data structure is maintained in an expert guidance maintenance component and comprises possible actions to resolve the service requests in respect of items of inventory detailed in the inventory data structure; and
   calculate a total priority of the service requests, wherein the total priority is based upon one or more of the priorities assigned to each action, source of the service request, or location; and
   determine a resource of a plurality of resources to which a service ticket for resolving an issue associated with the request is to be allocated, wherein the service ticket is allocated to the resource in the absence of the resource being provided details of the issue.

* * * * *